3,326,932
DISUBSTITUTED HYDANTOINS
Kiyoshi Kitasaki, Garden Grove, and Robert F. Crawford, La Mirada, Calif., assignors to United States Borax & Chemical Corporation, Los Angeles, Calif., a corporation of Nevada
No Drawing. Filed Nov. 26, 1963, Ser. No. 326,188
11 Claims. (Cl. 260—309.5)

This invention relates to novel disubstituted hydantoins and, more particularly, to novel 3,5-disubstituted hydantoins and their use as herbicides.

According to the present invention, there are provided novel hydantoin compounds of the formula

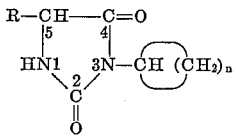

where R is lower alkyl of from 1 to about 3 carbon atoms, and $n$ is an integer of from 4 to about 7. Thus, the substituent at the 3-position is a cycloalkyl group such as cyclopentyl, cyclohexyl, cycloheptyl, cyclooctyl, and the like. Examples of substituents at the 5-position, represented by R, are methyl, ethyl, n-propyl and isopropyl.

The hydantoins of the present invention are normally crystalline solids which are soluble in the usual organic solvents, such as alcohols, ethers, and aromatic hydrocarbons. The compounds are excellent herbicides when applied as either a pre-emergence or a post-emergence treatment and may be formulated with the usual herbicide carriers for use in controlling unwanted plants.

The hydantoins are readily prepared by cyclization of the corresponding hydantoate with dilute mineral acid such as aqueous hydrochloric acid. The hydantoate is prepared by first converting the appropriate amino acid ester to the corresponding isocyanato compound which is then reacted with the corresponding cycloalkylamine to give the hydantoate.

The following equations illustrate the general scheme of preparation:

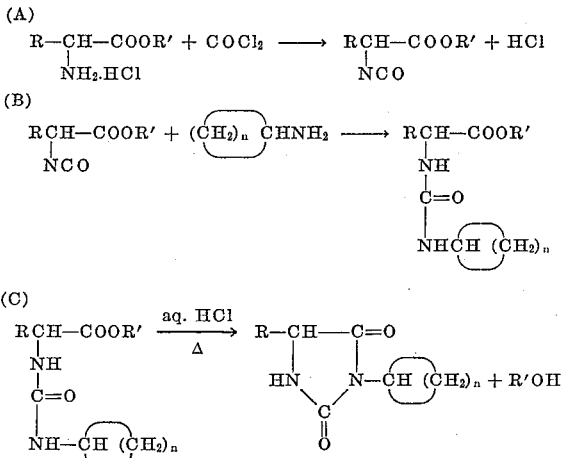

where R' preferably is a lower alkyl group and R and $n$ have the significance previously assigned.

In the reaction illustrated by Equation A, the isocyanato compound is formed by the known reaction of the amine with phosgene in a relatively high boiling solvent, such as toluene, xylene or the like. The isocyanato compound is then reacted with the cycloalkylamine in the presence of an inert solvent such as ether, benzene or toluene at an elevated temperature such as the reflux temperature of the solvent as illustrated by Equation B. It is not necessary to isolate the hydantoate since, after removing most of the solvent, it can be heated at an elevated temperature with aqueous mineral acid such as hydrochloric acid to form the corresponding substituted hydantoin as illustrated by Equation C. The normally water-insoluble crystalline hydantoin is removed by conventional procedures and purified by recrystallization such as from alcohol-water mixtures.

Typical examples of compounds embraced by the present invention are:

3-cyclohexyl-5-ethylhydantoin
3-cyclopentyl-5-methylhydantoin
3-cyclopentyl-5-n-propylhydantoin
3-cyclohexyl-5-methylhydantoin
3-cyclooctyl-5-ethylhydantoin
3-cyclooctyl-5-n-propylhydantoin
3-cycloheptyl-5-isopropylhydantoin
3-cycloheptyl-5-methylhydantoin The substituted hydantoins of this invention are effective herbicidal compounds useful for controlling weed growth. "Weeds" as used herein is intended to include any plant growth which is undesirable. The compounds are useful as a pre-emergence or a post-emergence treatment; that is, they can be used to kill growing plants or they can be used to kill or prevent the emergence of seedlings of the plants. Thus, the compounds can be used to control the growth of weeds by applying a phytotoxic amount to the locus of the weeds, that is, the foliage of the growing plants or soil in which the plants are growing or will grow.

An application rate in the range of from about 1 to about 40 pounds of one or more of the active compounds per acre is generally an effective phytotoxic amount, although greater or lesser amounts can be used if desired. The presently preferred application rate is in the range of from about 2 to about 25 pounds per acre. At the lower application rates, such as less than about 15 pounds per acre, some of the compounds will selectively kill some species of plants without injury to other species. For example, when 3-cyclohexyl-5-methylhydantoin is applied as a pre-emergence treatment at an application rate of 2 pounds per acre, a complete kill of mustard and bindweed is obtained without injury to corn.

The following examples are presented to illustrate the preparation of and herbicidal activity of typical compounds of this invention, but it is to be understood that the invention is not limited to the specific examples given.

EXAMPLE I

*Ethyl 2-isocyanatopropionate*

A suspension of 159 g. (1.01 moles) of ethyl 2-aminopropionate hydrochloride in 1.5 liter of toluene was refluxed for two hours with a Dean-Stark trap to remove traces of water and ethanol. Phosgene was bubbled into the refluxing solution for six hours. The mixture was cooled, filtered and concentrated at reduced pressure. Distillation of the residual oil at 69°–74° C./19 mm. yielded 92.7 g. (64%) of the desired product, $n_D$ 1.4181 (24° C.).

*3-cyclohexyl-5-methylhydantoin*

A solution of 14.4 g. (0.1 mole) of ethyl 2-isocyanatopropionate in 50 ml. of benzene was added dropwise to a stirred solution of 9.9 g. (0.1 mole) of cyclohexylamine in 100 ml. of benzene. The mixture was refluxed for 2.5 hours and concentrated under reduced pressure. The residual hydantoate was refluxed for three hours in 40 ml. of 6 N hydrochloric acid and the acidic solution was concentrated to dryness. The resulting solid product was recrystallized from isopropyl alcohol to give 13.1 g. (67%) of the product which melted at 103°–117° C.

After recrystallization from cyclohexane, the compound melted at 119°–122° C.

Application of the compound as a methanolic solution at a rate of 8 pounds per acre gave a complete kill of corn, millet, rye grass, oats, peas, mustard, cucumber and snap bean plants when applied as a pre-emergence or post-emergence treatment.

EXAMPLE II

3-cyclooctyl-5-methylhydantoin

Ethyl 2-isocyanatopropionate (7.2 g.; 0.05 mole) was added dropwise to a stirred solution of 6.4 g. (0.05 mole) of cyclooctylamine in 100 ml. of benzene and the mixture was refluxed for 2 hours. Benzene was removed under reduced pressure and 30 ml. of 6 N hydrochloric acid was added to the residue. The acidic mixture was refluxed for 2.5 hours. A solid product precipitated upon cooling and the aqueous portion was decanted. The solid (5.1 g.; 45.5%) was recrystallized from a methyl alcohol-water mixture to give the desired hydantoin, M.P. 111°–113° C.

The compound was applied as a pre-emergence and post-emergence treatment to peas, mustard, cucumber and snap bean plants. A complete kill of the plants was obtained at an application rate of 15 pounds per acre.

EXAMPLE III

3-cycloheptyl-5-methylhydantoin

Ethyl 2-isocyanatopropionate (7.2 g.; 0.05 mole) was added dropwise to a stirred solution of 5.7 g. (0.05 mole) of cycloheptylamine in 100 ml. of benzene and the mixture was refluxed for 2 hours. Benzene was removed at reduced pressure, 30 ml. of 6 N hydrochloric acid was added to the residue and the mixture was refluxed for 2.5 hours. Upon cooling, two layers formed, the aqueous portion was decanted and the residual liquid crystallized on stirring. The solid product was recrystallized from a water-isopropyl alcohol mixture and 8.2 g. (78%) of the hydantoin was obtained; M.P. 87°–90° C. After recrystallization, the product melted at 89°–90° C.

The compound was applied as a pre-emergence and post-emergence treatment to millet, mustard, cucumber and snap beans. A complete kill of the plants was obtained at an application rate of 15 pounds per acre.

EXAMPLE IV

3-cyclopentyl-5-methylhydantoin

A mixture of 8.0 g. (0.056 mole) of ethyl 2-isocyanatopropionate and 4.8 g. (0.056 mole) of cyclopentylamine in 50 ml. of benzene was refluxed for two hours and then concentrated. The residual solid was refluxed for three hours in a mixture of 20 ml. of 3 N hydrochloric acid and 20 ml. of ethyl alcohol. The solution was concentrated and 6.8 g. of the hydantoin was isolated; M.P. 91°–93° C.

Application of the compound as a post-emergence treatment at a rate of 7.5 pounds per acre gave a complete kill of rye grass, mustard and snap bean plants.

EXAMPLE V

Ethyl 2-isocyanatobutanoate

A solution of 160 g. (0.955 mole) of ethyl 2-aminobutanoate hydrochloride in 1 liter of toluene was refluxed and traces of water and ethanol were removed using a Dean-Stark trap. Phosgene was then bubbled into the refluxing solution for 6 hours. Toluene was removed under reduced pressure and the residual oil was distilled, B.P. 88°–91° C./16 mm., to give 125.1 g. (79.5%) of the product, $n_D$ 1.4216 (24° C.).

3-cyclohexyl-5-ethylhydantoin

A solution of 15.7 g. (0.1 mole) of ethyl 2-isocyanatobutanoate in 25 ml. of benzene was added slowly to a stirred solution of 9.9 g. (0.1 mole) of cyclohexylamine in 100 ml. of benzene and the mixture was refluxed for 2 hours. The reaction mixture was concentrated and the residue was refluxed for two hours in 50 ml. of 6 N hydrochloric acid. The product precipitated on cooling and was dissolved in hot isopropyl alcohol-water mixture, filtered and cooled. The resulting solid was recrystallized from water-isopropanol mixture to give 17.1 g. (81.5%) of product melting at 127°–129° C.

When applied as a post-emergence treatment at an application rate of 15 pounds per acre, the compound gave complete kill of millet, rye grass, oats, mustard, cucumbers and snap beans with no detrimental effect to corn.

EXAMPLE VI

3-cyclopentyl-5-ethylhydantoin

A mixture of 7.6 g. (0.048 mole) of ethyl 2-isocyanatobutanoate and 4.3 g. (0.04 mole) of cyclopentylamine in 50 ml. of benzene was refluxed for 2 hours. The benzene solution was concentrated under reduced pressure and the residue was then refluxed for 15 hours in 20 ml. of 3 N hydrochloric acid and 20 ml. of ethanol. The solution was cooled and the product precipitated to give 8.5 g. (91%). After recrystallization from an ethanol-water mixture, the product melted at 94°–96° C.

When applied as a pre-emergence treatment at an application rate of 25 pounds per acre, the compound gave a complete kill of corn, millet, rye grass, oats, peas, mustard, cucumbers and beans.

EXAMPLE VII

3-cycloheptyl-5-ethylhydantoin

Ethyl 2-isocyanatobutanoate (7.2 g.; 0.045 mole) was added to a solution of 5.7 g. (0.05 mole) of cycloheptylamine in 100 ml. of benzene and the solution was refluxed for 0.5 hour. Benzene was removed at reduced pressure and the residue was refluxed for 2.5 hours in 20 ml. 3 N hydrochloric acid and 20 ml. of ethanol. The acidic solution was distilled to dryness and the solid residue was recrystallized from a methyl alcohol-water mixture to give 5.7 g. (56.5%) of the hydantoin, M.P. 105°–107° C.

When applied as a pre- or post-emergence treatment at a rate of 20 pounds per acre, a complete kill of mustard and cucumbers was obtained.

EXAMPLE VIII 3-cyclooctyl-5-ethylhydantoin (M.P. 70°–72° C.) was prepared in a similar manner by the reaction of ethyl 2-isocyanatobutanoate with cyclooctylamine.

When applied as a pre- or post-emergence treatment at a rate of 15 pounds per acre, a complete kill of mustard and cucumbers was obtained.

EXAMPLE IX

Ethyl 2-isocyanato-3-methylbutanoate

Phosgene was bubbled into a refluxing solution of 355 g. (2.12 moles) of ethyl 2-amino-3-methylbutanoate hydrochloride in 1500 ml. of toluene over a 7-hour period. The solution was concentrated, filtered and fractionated to give 240.2 g. (66.4% yield) of the desired ester, B.P. 95°–98° C./23 mm.; $n_D$ 1.4257 (24° C.).

3-cyclohexyl-5-isopropylhydantoin

Ethyl 2-isocyanato-3-methylbutanoate (7.96 g.; 0.047 mole) was added dropwise to a stirred solution of 4.96 g. (0.05 mole) of cyclohexylamine in 100 ml. of benzene and the mixture was refluxed for 2 hours. Benzene was removed under reduced pressure, 30 ml. of 6 N hydrochloric acid was added and the acidic solution was refluxed for 2.5 hours. This acid solution was distilled to dryness under reduced pressure and the residue was dissolved in ethyl alcohol and concentrated. The solid which formed was recrystallized from cyclohexane to give 10.5 g. (99%) of 3-cyclohexyl-5-isopropylhydantoin, M.P. 150°–151.5 C.

The compound was applied as a post-emergence treatment on corn, mustard, cucumber and bean plants at an application rate of 25 pounds per acre. A complete kill of mustard, cucumbers and beans was obtained with no deleterious effects on corn.

EXAMPLE X

3-cyclopentyl-5-isopropylhydantoin

Ethyl 2-isocyanato-3-methylbutanoate (8.0 g.; 0.047 mole) was added to a solution of 4.3 g. (0.05 mole) of cyclopentylamine in 50 ml. of benzene. The mixture was refluxed for 2 hours, concentrated and the residue was refluxed for 3 hours in a mixture of 20 ml. of 3 N hydrochloric acid and 20 ml. of ethyl alcohol. The acidic solution was concentrated and 5.3 g. of crystalline product was isolated; M.P. 107°–109° C.

When applied as a pre-emergence treatment at an application rate of 7.5 pounds per acre, a complete kill of millet, mustard, cucumber and bean plants was obtained.

EXAMPLE XI

3-cycloheptyl-5-isopropylhydantoin

Ethyl 2-isocyanato-3-methylbutanoate (8.0 g.; 0.047 mole) was added to a solution of 5.7 g. (0.05 mole) of cycloheptylamine in 75 ml. of benzene and the solution was refluxed for 2 hours. The reaction mixture was concentrated and the residual oil was refluxed for 4 hours in a mixture of 20 ml. of 3 N hydrochloric acid and 20 ml. of ethanol. The acidic solution was concentrated to dryness and the residual solid was recrystallized from a water-methanol mixture to give 4.8 g. of product, M.P. 116°–120° C. Further recrystallization of a small sample from methanol gave the hydantoin melting at 118°–122° C.

When applied as a post-emergence treatment at a rate of 25 pounds per acre, the compound gave a complete kill of mustard, cucumbers and beans.

EXAMPLE XII

3-cyclooctyl-5-isopropylhydantoin

Ethyl 2-isocyanato-3-methylbutanoate (8.0 g.; 0.047 mole) was added to 6.3 g. (0.05 mole) of cyclooctylamine in 50 ml of benzene and the solution was refluxed for two hours. The reaction mixture was concentrated and the residue was refluxed for four hours in 20 ml. of 6 N hydrochloric acid. The acidic solution was cooled precipitating 5.0 g. of product which was removed by filtration. Recrystallization from 50% ethanol gave the desired hydantoin, M.P. 119°–121° C.

EXAMPLE XIII

Ethyl 2-isocyanatopentanoate

A suspension of 200 g. of 2-aminopentanoic acid in 1700 ml. of ethyl alcohol was saturated with dry hydrogen chloride gas and the resultant solution was refluxed for six hours. Ethyl alcohol was removed by distillation under reduced pressure until a thick oily residue was obtained. The residue was suspended in 1500 ml. of toluene and refluxed until final traces of water and ethyl alcohol were removed as a toluene azeotrope. Phosgene was bubbled into the dry refluxing toluene suspension for 6.5 hours and the toluene then removed by distillation under reduced pressure. The residual oil was distilled at 105°–107° C./25–26 mm. and 212.9 g. (77%) of the 2-isocyanatopentanoate was obtained; $n_D$ 1.4258 (24° C.).

3-cyclohexyl-5-n-propylhydantoin

Ethyl 2-isocyanatopentanoate (8.0 g.; 0.047 mole) was added to 5.0 g. (0.05 mole) of cyclohexylamine in 50 ml. of benzene and the mixture was refluxed for two hours. The reaction mixture was concentrated at reduced pressure and the residue was refluxed for three hours in 20 ml. of 3 N hydrochloric acid and 20 ml. of ethanol. The acidic solution was concentrated and the crude solid product (8.1 g.) was separated. After recrystallization from methanol-water, the product melted at 104–106° C.

Application of the compound as a pre-emergence treatment at a rate of 15 pounds per acre gave a complete kill of mustard, cucumbers and beans.

EXAMPLE XIV

3-cycloheptyl-5-n-propylhydatoin

Ethyl 2-isocyanatopentanoate (8.0 g.; 0.047 mole) was added to 5.7 g. (0.05 mole) of cycloheptylamine in 50 ml. of benzene and the mixture was refluxed for two hours. Benzene was removed at reduced pressure and the residual oil was refluxed for four hours in a mixture of 20 ml. of 6 N hydrochloric acid and 20 ml. of ethanol. The reaction mixture was cooled and 6.95 g. (62.5%) of product was separated, M.P. 74°–78° C. The product was recrystallized from 50% ethanol to give the hydantoin melting at 85°–85.5° C.

When applied as a post-emergence treatment at a rate of 30 pounds per acre, the compound gave a complete kill of mustard and cucumbers.

Since a relatively small amount of one or more of the active substituted hydantoins should be uniformly distributed over the area to be treated, the compounds preferably are formulated with conventional herbicidal carriers, either liquid or solid. Thus, the compounds can be impregnated on or admixed with a solid carrier such as lime, talc, clay, bentonite, calcium chloride, vermiculite, calcium carbonate, and the like. Alternatively, the compounds can be dissolved or suspended in a liquid carrier such as water, kerosene, alcohols, Diesel oil, xylene, benzene, glycols and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispursing agents and emulsifying agents. Typical surfactants include the alkylarylsulfonates, the fatty alcohol sulfates, sodium salts of naphthalenesulfonic acid, alkylaryl polyether alcohols, long chain quaternary ammonium compounds, sodium salts of petroleum-derived alkylsulfonic acids, polyoxyethylenesorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active herbicidal agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 99 percent by weight of one or more of the active substituted hydantoins with a carrier or diluent, which may be a solid or liquid. Liquid carriers which are miscible with the active agent or other liquids in which the compound may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as sodium chlorate and the sodium borates, 2,3,6-trichlorobenzyloxypropanol, the chlorophenoxyacetic acids, trichlorobenzoic acids, substituted ureas, triazines, uracils and carbamates, can be included in the formulations.

The following examples are presented to illustrate the preparation of suitable herbicidal compositions of this invention.

EXAMPLE XV

| | Percent |
|---|---|
| 3-cyclohexyl-5-methylhydantoin (powdered) | 4 |
| Granular clay | 96 |

A granular formulation can be prepared by dry blending the above constituents until uniformly mixed in a rotary mixer. A fine spray of water is sprayed onto the mixture, while tumbling, to adhere the compound to the clay. The material is then air dried while tumbling to give a granular formulation which can be applied to the soil or vegetation by hand or by a mechanical spreader.

EXAMPLE XVI

| | Percent |
|---|---|
| 3-cyclohexyl-5-ethylhydantoin | 85 |
| Bentonite clay | 14 |
| Sodium lauryl sulfate surfactant | 1 |

A wettable powder formulation can be prepared by micronizing the hydantoin and mixing uniformly with powdered bentonite clay and powdered sodium lauryl sulfate. The wettable powder can be added to water or hydrocarbon oil and mechanically agitated to insure a uniform dispersion which can be sprayed with conventional equipment on soil or vegetation.

EXAMPLE XVII

| | Percent |
|---|---|
| 3-cycloheptyl-5-methylhydantoin | 15 |
| Polyoxyethylenesorbitan monolaurate | 2 |
| Isopropanol | 40 |
| Xylene | 43 |

The hydantoin is dissolved in a mixture of isopropanol and xylene to form a concentrated solution. The emulsifying agent is then dissolved and a liquid formulation of an emulsifiable concentrate is obtained. The emulsifiable concentrate can be added to water to dilute to a desired concentration, and then be sprayed with conventional equipment on soil or vegetation.

EXAMPLE XVIII

| | | |
|---|---|---|
| 3-cyclopentyl-5-isopropyl hydantoin | lb | 0.1 |
| Petroleum hydrocarbon weed oil | gal | 1 |

The hydantoin is dissolved in a petroleum hydrocarbon weed oil. The formulation can be sprayed with conventional spray equipment on vegetation at a volume of 100 gal./a. to give an application rate of 10 pounds of the hydantoin per acre.

EXAMPLE XIX

| | Percent |
|---|---|
| 2-cyclopentyl-5-methylhydantoin | 50 |
| Bentonite clay | 48 |
| Sodium alkylaryl sulfonate | 2 |

The powdered hydantoin is dry blended in a rotary mixer with powdered bentonite clay and powdered sodium alkylarylsulfonate until uniformly mixed. Three to five percent water is sprayed on to the blended materials and then the blend is fed into a pellet extrusion apparatus. The moist extruded pellets are air-dried. The pellets can be applied by hand or mechanically to soil or vegetation to be treated.

EXAMPLE XX

| | Percent |
|---|---|
| 3-cyclooctyl-5-methylhydantoin | 4 |
| Sodium borate pentahydrate | 96 |

Granular sodium borate pentahydrate is dry blended with the powdered hydantoin. Five percent water is added to the blended mixture to adhere the hydantoin to the granular borate and the mixture then air-dried. The granular formulation can be applied by hand or with a mechanical spreader to the soil or on vegetation.

Other modes of applying the principle of the invention may be employed, change being made as regards the details described, provided the features stated in any of the following claims or the equivalent of such be employed.

We, therefore, particularly point out and distinctly claim as our invention:

1. A compound of the formula $$\begin{array}{c} R\text{—}CH\text{—}C\text{=}O \\ | \quad\quad\quad | \\ HN \quad\quad N\text{—}CH\,(CH_2)_n \\ \diagdown C \diagup \\ \| \\ O \end{array}$$

where R is lower alkyl of from 1 to 3 carbon atoms and $n$ is an integer of from 4 to 7.

2. 3-cyclopentyl-5-lower alkylhydantoin in which said lower alkyl group has not more than 3 carbon atoms.
3. 3-cyclohexyl-5-lower alkylhydantoin in which said lower alkyl group has not more than 3 carbon atoms.
4. 3-cycloheptyl-5-lower alkylhydantoin, in which said lower alkyl group has not more than 3 carbon atoms.
5. 3-cyclohexyl-5-methylhydantoin.
6. 3-cyclohexyl-5-ethylhydantoin.
7. 3-cyclooctyl-5-lower alkylhydantoin in which said lower alkyl group has not more than 3 carbon atoms.
8. 3-cyclopentyl-5-methylhydantoin.
9. 3-cycloheptyl-5-methylhydantoin.
10. 3-cyclooctyl-5-methylhydantoin.
11. 3-cyclopentyl-5-isopropylhydantoin.

References Cited

UNITED STATES PATENTS

| | | | |
|---|---|---|---|
| 2,629,660 | 2/1953 | Harsh | 260—309.5 X |
| 2,779,764 | 1/1957 | Paterson | 260—309.5 |
| 2,909,420 | 10/1959 | Gysin et al. | 71.—2.5 |
| 2,942,004 | 6/1960 | Cane | 260—309.5 |
| 2,972,618 | 2/1961 | Bortnick | 260—309.5 |
| 3,134,663 | 5/1964 | Kroll | 71—2.5 |

FOREIGN PATENTS

| | | |
|---|---|---|
| 1,039,302 | 3/1959 | Germany. |
| 644,032 | 7/1962 | Canada. |

WALTER A. MODANCE, *Primary Examiner.*

NATALIE TROUSOF, *Assistant Examiner.*